United States Patent [19]

Nakayama

[11] Patent Number: 4,580,071
[45] Date of Patent: Apr. 1, 1986

[54] GENERATOR COOLING APPARATUS

[75] Inventor: Taesuke Nakayama, Kobe, Japan

[73] Assignee: Mitsubishi Denki Kabushiki Kaisha, Tokyo, Japan

[21] Appl. No.: 629,374

[22] Filed: Jul. 10, 1984

[30] Foreign Application Priority Data

Jul. 28, 1983 [JP] Japan .................. 58-139741[U]
Jul. 28, 1983 [JP] Japan ...................... 58-118772

[51] Int. Cl.$^4$ ............................................. H02K 9/06
[52] U.S. Cl. .................................. 310/62; 310/53;
310/59; 310/68 C; 310/74; 310/157; 307/39
[58] Field of Search ............. 310/62, 63, 60 R, 60 A,
310/64, 65, 59, 53, 68 R, 68 C, 74, 68 E, 90, 153,
52, 157, 113, 58, 112, 114; 200/5 E; 307/38, 39;
322/DIG. 1; 165/137, DIG. 14; 98/43 A, 116,
121 A; 336/57

[56] References Cited

U.S. PATENT DOCUMENTS

| 1,661,262 | 3/1928 | Newton | 310/74 UX |
|---|---|---|---|
| 3,746,802 | 7/1973 | Sandi | 200/5 E |
| 3,917,433 | 11/1975 | Tomitaka | 98/116 |
| 4,347,451 | 8/1982 | Mizuyama | 310/60 A |
| 4,383,191 | 5/1983 | Mizuyama | 310/269 |
| 4,467,229 | 8/1984 | Ogita | 310/157 |

FOREIGN PATENT DOCUMENTS

| 0901016 | 11/1953 | Fed. Rep. of Germany | 310/74 |
|---|---|---|---|
| 8100446 | 2/1981 | Int'l Pat. Institute | 307/39 |
| 0133952 | 10/1951 | Japan | 310/62 |
| 0106100 | 8/1980 | Japan | 322/DIG. 1 |
| 0155532 | 12/1980 | Japan | 310/74 |

Primary Examiner—R. Skudy
Attorney, Agent, or Firm—Sughrue, Mion, Zinn, Macpeak & Seas

[57] ABSTRACT

A variable output generator for supplying electrical power to a specific load is cooled by a plurality of motor driven fans 112, 113, 114, 115 disposed in a generator pit 2. An appropriate number of motor driven fans for providing cooling air for the generator are energized in response to the instantaneous generator output, to thereby avoid wasteful power consumption.

6 Claims, 9 Drawing Figures

GENERATOR COOLING APPARATUS

BACKGROUND OF THE INVENTION

This invention relates to a generator cooling apparatus having a plurality of selectively energized motor driven fans.

In general, the fan function of the rotor of a generator may be used to self-cool the generator. However, since the cooling ability of such a system is not sufficient to cool a large capacity generator, a separate cooling system is employed including a plurality of motor driven fans disposed around the circumference of the generator.

FIG. 1 shows a large capacity flywheel type generator cooled by a conventional separate cooling system. A flywheel generator utilizes a flywheel for storing electrical energy by converting it to rotary inertial energy, and then releases the rotary inertial energy to reconvert it to electrical energy when required.

In FIG. 1 an upper circular generator pit 2 and a lower circular flywheel pit 3 are formed within a concrete foundation 1. A plurality of ventilating passages 4 are provided within the concrete foundation 1 to connect the generator pit to the flywheel pit. The rotor 5 of the generator is disposed in the generator pit. A flywheel 7 is coupled to the lower end of the rotor shaft 6. A thrust collar 8 is attached to the underside of the flywheel, and is rotatably supported by a thrust bearing 9. A motor 10 is connected to the upper end of the rotor shaft 6. A generator stator 11 is disposed around the rotor 5. A plurality of motor driven fans 12, 13, 14, and 15 are disposed at certain positions within the generator pit 2 to provide cooling air to the rotor 5 and stator 11, as indicated by the arrows.

Each of the conventional motor driven fans 12, 13, 14, and 15 is constructed as shown in FIGS. 2 and 3, wherein a motor 17 is mounted within a circular frame or cowling 16 by support members 18 and drives a fan 19.

The time sequence of various functions of the flywheel generator is shown by line a in FIG. 4. The rotor 5 is initially spun up by the motor 10 until its rotation speed reaches $n_1$ rpm, whereafter the acceleration ceases and concurrently the generation of electric power is started. Rotary inertial energy stored by the flywheel is converted into electrical energy, which is extracted from the stator 11 of the generator. The rotor speed decreases during generation, and no electric power is extracted after the rotational speed drops to $n_2$ rpm. The rotor remains at the $n_2$ speed solely by inertial flywheel energy, and after a certain stand-by period it is again accelerated by the motor 10 up to the $n_1$ speed.

In such a way the flywheel generator supplies a large amount of electric power according to the load demand. On the other hand, as shown by line b in FIG. 4, the cooling fans 12, 13, 14, and 15 are operated continuously, during both the loaded and unloaded periods of the generator.

Although the flywheel generator supplies electric power according to the demand of various loads, in the case of experimental nuclear fusion devices or the like, the periods of maximum rated output are considerably smaller or less than the periods of low or no output. The ventilation capacity of the fans is necessarily designed for sufficient cooling at the maximum rated output, however, and their continous operation wastefully consumes from 200 kw to 300 kw of electrical power.

SUMMARY OF THE INVENTION

It is principal object of this invention to provide a generator cooling apparatus which operates with the utmost efficiency by selecting an appropriate number of motor driven fans for cooling the generator according to its output.

It is another object of this invention to provide a generator cooling apparatus which efficiently cools the generator by preventing any reverse flow of the cooling air.

These objects are accomplished by energizing only a selected number of cooling fans as a function of the measured instantaneous power output of the generator. In addition, each fan installation is provided with hinged louvres of baffle plates at one end of its mounting tunnel to automatically close the tunnel and thereby prevent any reverse air flow when the associated fan is deenergized.

DETAILED DESCRIPTION OF THE PREFERRED EMBODIMENT

Figure 1:
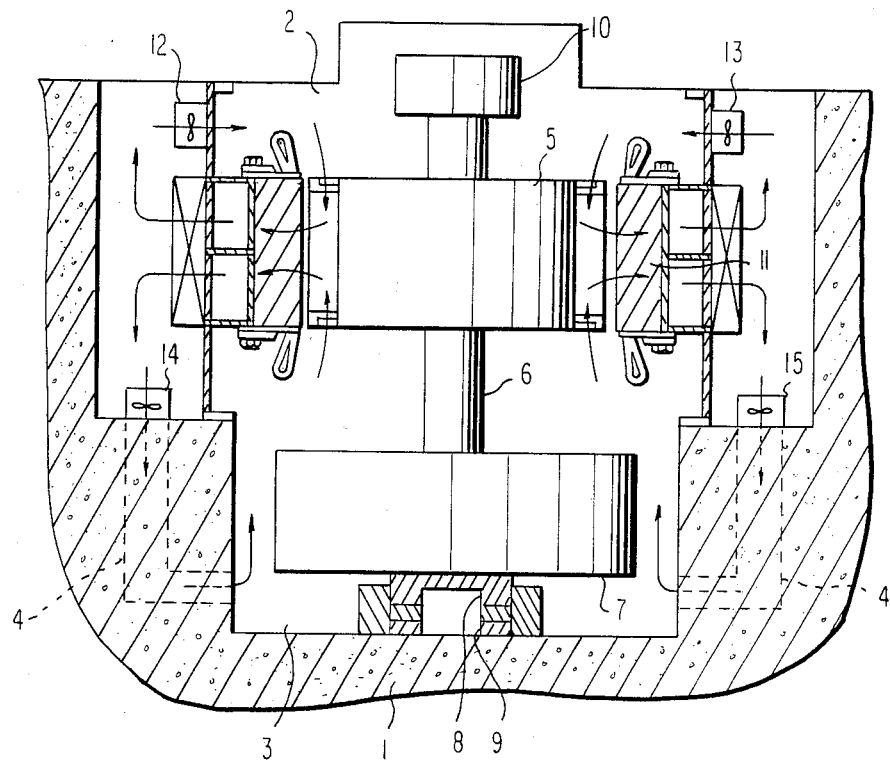
FIG. 1 is a longitudinal sectional view of a flywheel generator employing a conventional cooling apparatus.
Figure 2:
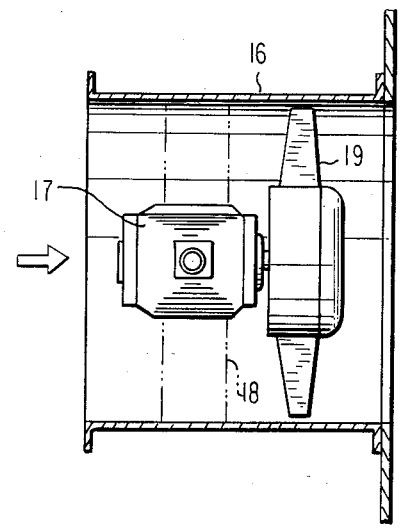
FIG. 2 is a sectional side elevation of a conventional motor driven cooling fan.
Figure 3:
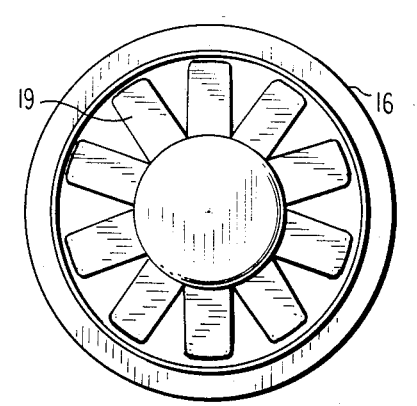
FIG. 3 is a front elevation of the fan of FIG. 2.
Figure 4:
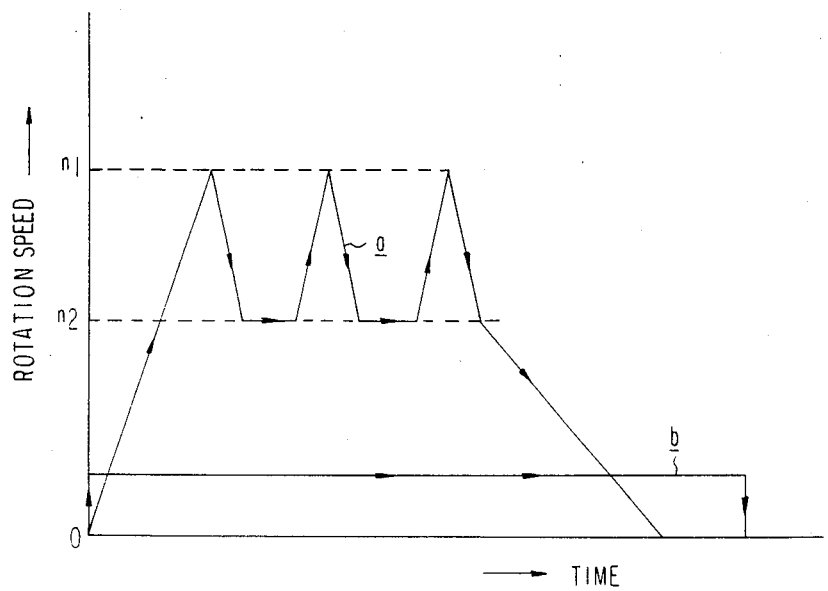
FIG. 4 is a diagram showing the time sequence of various functions of flywheel generators and conventional motor driven fans.
Figure 5:
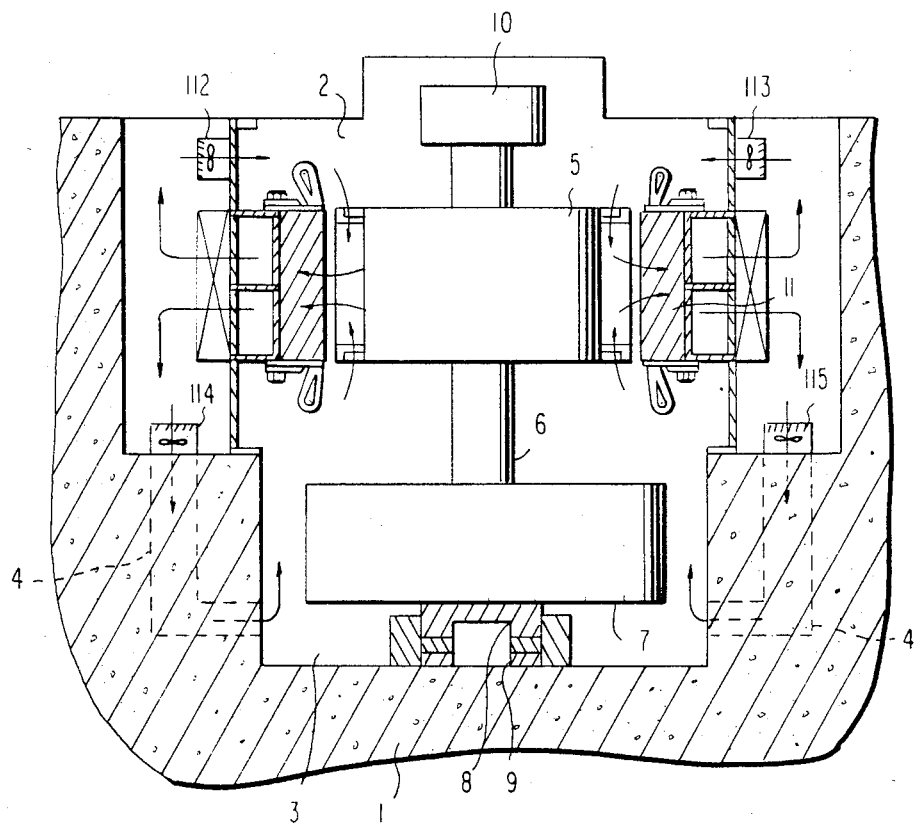
FIG. 5 is a longitudinal sectional view of a flywheel generator having a cooling apparatus in accordance with the present invention.
Figure 8:
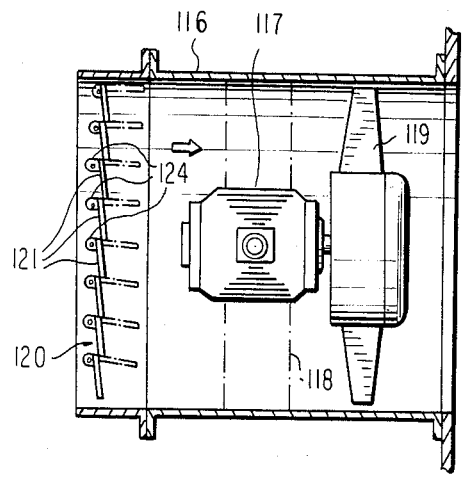
FIG. 8 is a side elevation of the motor driven cooling fan of the present invention.
Figure 9:
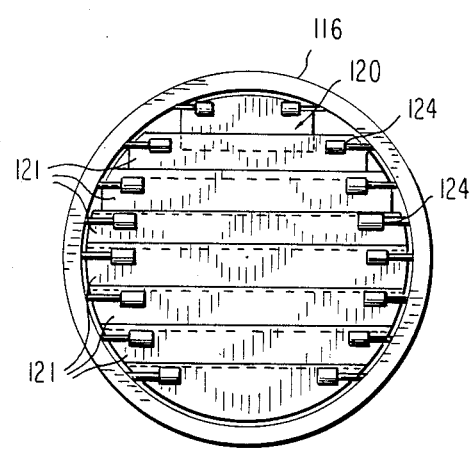
FIG. 9 is a rear elevation of the fan of FIG. 8.

Referring to FIG. 5, of the illustrated structure corresponds to that shown in FIG. 1 with the exception of the motor driven cooling fans 112, 113, 114 and 115, and will thus not be described in detail. The fans are constructed as shown in FIGS. 8 and 9, and include a motor 117 mounted within a frame 116 by support members 118 and driving a fan 119. A reverse cooling air flow preventing structure 120 is provided on one end of the frame, and is formed of a plurality of plate members 121 rotatably mounted by pins 124 disposed on the frame. Their open position is shown by the chain lines in FIG. 9.

The plate members 121 hang downwardly by their own weight to close the end of the circular frame tunnel when the motor is de-energized or stops and there is no forward air flow present. Under these conditions, cooling air flowing in the opposite direction from the arrow in FIG. 8 will be prevented from back flowing through the frame.

Figure 6:
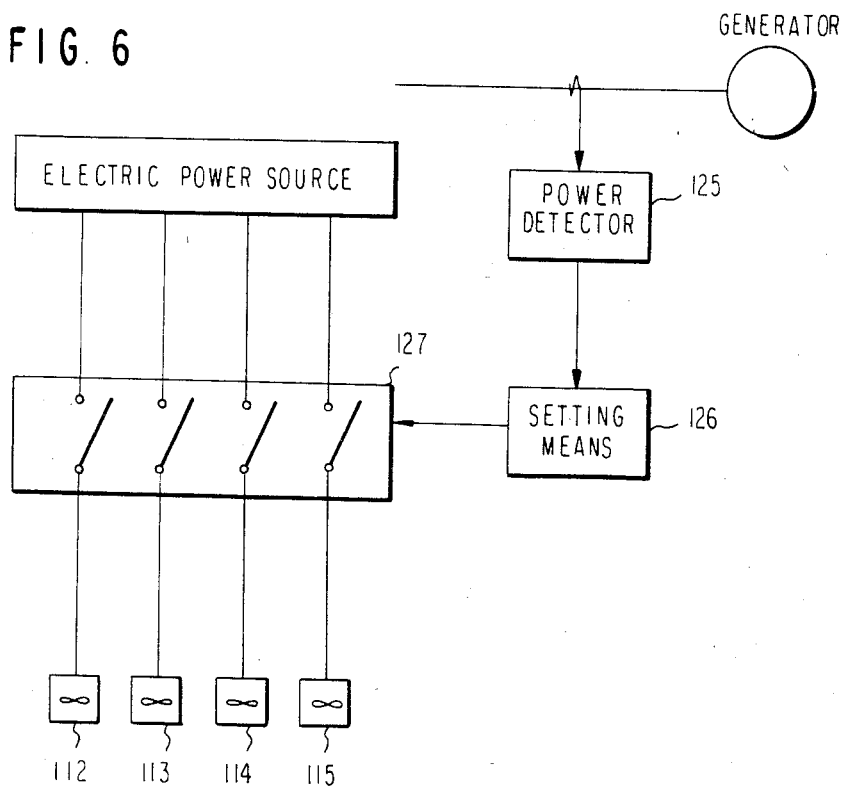
FIG. 6 is a schematic diagram of the control unit of the cooling apparatus of FIG. 5.
Figure 7:
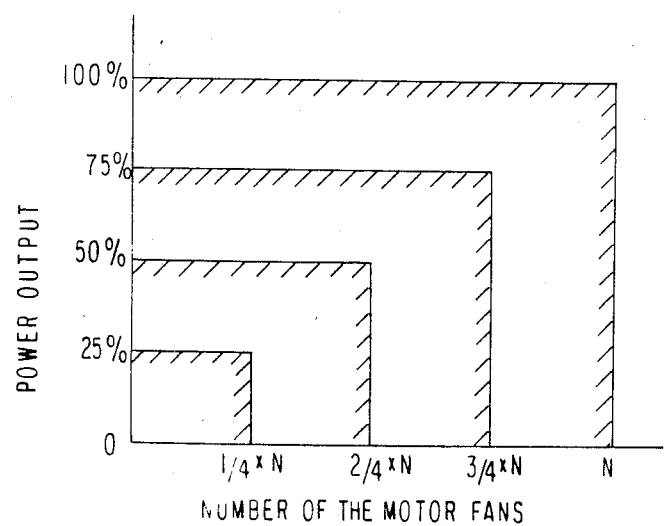
FIG. 7 is a graph showing the relationship between the output of generator and the number of fans energized by the control unit.

FIG. 6 shows a control unit which comprises detecting means 125 for detecting the power output of the generator, selecting or setting means 126, coupled to the detecting means, for determining the number of fans to be energized in accordance with the power output of the generator, and actuating means 127 for driving the fans selected by the setting means 126. The detecting means 125 may comprise a wattmeter which measures the instantaneous power output of the generator. The setting means 126 may comprise a comparator which determines the required number of motor fans by comparing the measured output by the detecting means 125 with a 100% output level of the generator. For example, as shown in FIG. 7 the number of motor driven fans required is determined such that N fans are energized when the power output of the generator is 100%, 3/4N when it is 75%, 2/4N when it is 50%, and 1/4N when it is 25%. The actuating means 127 includes a plurality of switches individually installed between the electric power source and the fans 112, 113, 114, and 115 such that the required number of cooling fans are energized or driven in accordance with the output of the setting means 126. The fans are thus selectively operated in accordance with the power output currently being extracted from the generator.

Although the above description relates to a flywheel generator, this invention can also be applied, for example, to a conventional water-wheel generator. The plate members 121 may so be closed by air pressure, oil pressure, or magnetic force. Although only four cooling fans have been described, this is purely by way of simplified example. The actual number of fans for a given installation would be determined by the maximum generator output and the physical dimensions of the system, the capacity of the individual fans selected, etc.

As mentioned above, according to this invention the number of cooling fans energized is selected in accordance with the power output of the generator so that no electrical power is wastefully consumed. Also, the flow of the cooling air in any but the desired direction is prevented to thus contribute to an improved cooling effect.

What is claimed is:

1. A cooling apparatus for a generator, comprising:
    (a) a generator (5, 11) for supplying electrical power according to a specific load, said generator being disposed in a generator pit (2);
    (b) a plurality of motor driven fans (112, 113, 114, 115) selectively energizable to provide cooling air for said generator, said fans being disposed in appropriate positions in the generator pit;
    (c) means (125) for detecting, and providing an output indicative of, the instantaneous power output of said generator;
    (d) setting means (126), coupled to said detecting means, for determining, and providing an output indicative of, the number of said fans required to provide cooling air according to the output of said detecting means; and
    (e) actuating means (127), coupled to said setting means, for selectively energizing said fans according to the output of said setting means.

2. The cooling apparatus of claim 1, wherein said generator pit is disposed within a concrete foundation (1).

3. The cooling apparatus of claim 1, wherein said generator is a flywheel type generator.

4. The cooling apparatus of claim 1, wherein each of said fans is provided with a structure for preventing a reverse flow of cooling air.

5. The cooling apparatus of claim 4, wherein said reverse flow preventing structure is formed of a plurality of rotatable plate members (121).

6. The cooling apparatus of claim 5, wherein said plurality of rotatable plate members are closed when an associated fan is deenergized.

* * * * *